United States Patent
Choi et al.

(10) Patent No.: US 9,647,260 B2
(45) Date of Patent: May 9, 2017

(54) METHOD OF MANUFACTURING ANODE FOR THERMALLY ACTIVATED RESERVE BATTERY USING THIN METAL FOAM AND CUP

(71) Applicant: Agency for Defense Development, Daejeon (KR)

(72) Inventors: Yu Song Choi, Daejeon (KR); Hye-Ryeon Yu, Daejeon (KR); Jung Min Lee, Seoul (KR); Hae Won Cheong, Sejong-si (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 117 days.

(21) Appl. No.: 14/438,536

(22) PCT Filed: Jul. 28, 2014

(86) PCT No.: PCT/KR2014/006854
§ 371 (c)(1),
(2) Date: Apr. 24, 2015

(87) PCT Pub. No.: WO2016/013704
PCT Pub. Date: Jan. 28, 2016

(65) Prior Publication Data
US 2016/0276651 A1    Sep. 22, 2016

(30) Foreign Application Priority Data
Jul. 23, 2014 (KR) .................. 10-2014-0093194

(51) Int. Cl.
*H01M 4/06* (2006.01)
*H01M 4/08* (2006.01)
(Continued)

(52) U.S. Cl.
CPC .......... *H01M 4/08* (2013.01); *H01M 2/1673* (2013.01); *H01M 4/0404* (2013.01);
(Continued)

(58) Field of Classification Search
CPC ........ H01M 6/36; H01M 4/08; H01M 4/0404; H01M 4/0416; H01M 4/0435; H01M 4/0471
(Continued)

(56) References Cited

U.S. PATENT DOCUMENTS 7,354,678 B2    4/2008  Machado et al.

FOREIGN PATENT DOCUMENTS

| JP | 01-122562 A | 5/1989 |
| JP | 03-119661 A | 5/1991 |

(Continued)

OTHER PUBLICATIONS

Hatanaka et al. JP H05-101831. English machine translation by EPO.*

(Continued)

*Primary Examiner* — James Lee
(74) *Attorney, Agent, or Firm* — John P. White; Cooper & Dunham LLP

(57) ABSTRACT

Disclosed is a method of manufacturing an anode for a thermally activated reserve battery using a thin metal foam and a cup, which includes rolling a metal foam, coating the metal foam with a molten eutectic salt, impregnating the metal foam with lithium, and providing the metal foam with an electrode cup and a conductive separation membrane, and in which lithium having excellent capacity and output characteristics is employed in an anode for a thermal battery operating at high temperature.

10 Claims, 2 Drawing Sheets

(51) Int. Cl.
  *H01M 6/36* (2006.01)
  *H01M 4/04* (2006.01)
  *H01M 4/38* (2006.01)
  *H01M 4/66* (2006.01)
  *H01M 4/80* (2006.01)
  *H01M 2/16* (2006.01)
  *H01M 4/62* (2006.01)

(52) U.S. Cl.
  CPC ....... *H01M 4/0416* (2013.01); *H01M 4/0435* (2013.01); *H01M 4/0471* (2013.01); *H01M 4/0483* (2013.01); *H01M 4/06* (2013.01); *H01M 4/382* (2013.01); *H01M 4/62* (2013.01); *H01M 4/661* (2013.01); *H01M 4/663* (2013.01); *H01M 4/808* (2013.01); *H01M 6/36* (2013.01)

(58) Field of Classification Search
  USPC .......................... 29/623.5; 429/236, 241, 323
  See application file for complete search history.

(56) References Cited

FOREIGN PATENT DOCUMENTS

| | | |
|---|---|---|
| JP | 5-101831 | 4/1993 |
| JP | 05-101831 A | 4/1993 |
| JP | 05-251090 A | 9/1993 |
| JP | 07-040489 A | 2/1995 |
| JP | 7-40489 | 5/1995 |
| JP | 08-031431 A | 2/1996 |
| JP | 2006-236990 | 9/2006 |
| JP | 2006-236990 A | 9/2006 |
| KR | 10-1232094 B1 | 2/2013 |

OTHER PUBLICATIONS

Hao, Ting, Motoaki Matsuo, Yuko Nakamori, and Shin-ichi Orimo. "Impregnation method for the synthesis of Li—N—H systems" Journal of Alloys and Compounds 458 (2008): L1-L5.*
Choi, Y. S. et al. (Jun. 2014). *Electrochemical properties of lithium-based anodes with metal foams for thermal batteries*. Poster presented at 46$^{th}$ Power Sources Conference, Orlando, FL.
International Search Report, mailed Dec. 15, 2014 in connection with PCT International Application No. PCT/KR2014/006854, filed Jul. 28, 2014.
Written Opinion of the International Searching Authority, mailed Dec. 15, 2014 in connection with PCT International Application No. PCT/KR2014/006854, filed Jul. 28, 2014.
Aug. 19, 2014 Korean official action (including English translation) in connection with corresponding Korean patent application No. 10-2014-0093194.
Dec. 15, 2014 Korean final official action (including English translation) in connection with corresponding Korean patent application No. 10-2014-0093194.
Jan. 12, 2015 Notice of Allowance (including English translation) in connection with corresponding Korean patent application No. 10-2014-0093194.

* cited by examiner

METHOD OF MANUFACTURING ANODE FOR THERMALLY ACTIVATED RESERVE BATTERY USING THIN METAL FOAM AND CUP

CROSS-REFERENCE TO RELATED APPLICATIONS

This application is a §371 national stage of PCT International Application No. PCT/KR2014/006854, filed Jul. 28, 2014, claiming priority of Korean Patent Application No. 10-2014-0093194, filed Jul. 23, 2014, the contents of each of which are hereby incorporated by reference in their entirety.

TECHNICAL FIELD

The present invention relates to a method of manufacturing an anode for a reserve battery and, more particularly, to a method of manufacturing an anode for a thermally activated reserve battery using a thin metal foam and a cup, wherein, in order to prevent leakage of lithium having excellent capacity and output characteristics, a metal foam as an anode support impregnated with lithium is provided with an electrode cup and a conductive separation membrane.

BACKGROUND ART

Generally, a thermally activated reserve battery (thermal battery), which does not exhibit battery performance at room temperature, is operated in such a manner that when an igniter of the battery begins to burn in response to an electrical signal applied thereto, a heat source between electrodes is ignited due to heat generated from the igniter to thereby melt a solid electrolyte due to heat produced from the heat source.

Such a thermally activated reserve battery is superior in terms of structural stability, reliability, and long-term storability.

Hence, the thermally activated reserve battery having the advantages described above is useful as an emergency power supply for civilian purposes and as a main or auxiliary power supply in the aerospace industry or for guided weapons for military purposes.

Since the thermally activated reserve battery is characterized in that the electrolyte thereof is not conductive at room temperature, it has no intrinsic energy loss and may thus be stored for a long period of time. Furthermore, this battery may be favorably used without deterioration of performance thereof even after long-term storage.

Devices using batteries have been developed in a trend of requiring a decrease in the volume of the battery and an increase in the capacity and output of the battery.

Accordingly, batteries are manufactured to be small and integrated. In particular, thorough research into energy density and high output of thermally activated reserve batteries is ongoing.

As studies for desired energy density and high output are carried out using new expensive electrode materials or by means of special processes or related instruments, economic loss and complicated processing are incurred. Furthermore, conventional electrode materials do not satisfy requirements of high energy density and high output.

A currently available thermal battery mainly includes an anode material such as LiSi, a cathode material such as $FeS_2$, and an electrolyte composed of LiCl—KCl and LiBr—LiCl—LiF.

As for a $LiSi/FeS_2$ thermal battery, however, the weight of LiSi (1,747 A·s/g) for an anode is smaller than that of $FeS_2$ (1,206 A·s/g). Hence, the volume of LiSi has to be increased to achieve high battery capacity. In an electrochemical reaction, actual availability of LiSi becomes much lower due to phase change for $FeS_2$, and thus limitations are imposed on using it as an anode material for a thermal battery requiring large capacity and high output.

To solve the problems of LiSi, LAN (Lithium anode) related patents published by CRC (Catalyst Research Center) disclose methods of using pure lithium having excellent capacity and output characteristics as known to date as an anode for a thermal battery in such a manner that it is added with an iron (Fe) powder binder to increase the viscosity of lithium at a temperature equal to or higher than the melting temperature (180° C.) of lithium. In some developed countries, thermal batteries having high energy density and high output density have been developed using such technology.

However, the above technology is problematic because lithium has to be mixed with about 80 wt % of iron powder to reduce melting of pure lithium, and thus the energy density thereof is remarkably decreased compared to theoretical lithium energy density.

Although some research into impregnation of a metal foam with lithium is ongoing, it is difficult to uniformly impregnate the metal foam with lithium upon actual application.

Moreover, even when the metal foam is impregnated with lithium, the resulting unit cell battery may undesirably short out attributed to leakage of lithium.

DISCLOSURE

Technical Problem

The present invention has been made keeping in mind the above problems, and an object of the present invention is to provide a method of manufacturing an anode for a thermally activated reserve battery using a thin metal foam and a cup, which enables energy and output characteristics to be drastically enhanced compared to when using conventional anode materials.

Technical Solution

In order to accomplish the above object, the present invention provides a method of manufacturing an anode for a thermally activated reserve battery using a thin metal foam and a cup, comprising rolling a metal foam, coating the metal foam with a molten eutectic salt, impregnating the metal foam with lithium, and providing the metal foam with an electrode cup and a conductive separation membrane.

In one aspect of the present invention, the metal foam may comprise a porous material having excellent electrical conductivity. The metal foam may have a porosity of 60~98% of the total volume thereof and pores of the metal foam may be formed into an average diameter of 850 μm or less. The metal foam may be made of a nickel alloy or an iron alloy comprising nickel, iron, and a carbon material. As such, the carbon material may comprise any one selected from among pure carbons for receiving lithium, including carbon black, carbon fiber, carbon nanofiber, carbon nanotubes, graphene, and graphite.

In another aspect of the present invention, rolling the metal foam may be performed at a pressure of 5,000~20,000 kgf. The eutectic salt may comprise a LiCl—KCl lithium eutectic salt or a LiCl—LiBr—LiF lithium eutectic salt.

Also, coating the metal foam with the eutectic salt may be performed in such a manner that the metal foam is immersed in the eutectic salt for 1~5 sec, taken out of the eutectic salt, and rapidly cooled at room temperature.

In still another aspect of the present invention, impregnating the metal foam with lithium may be performed using lithium having a volume 1~1.5 times the total volume of pores of the metal foam. Also, impregnating the metal foam with lithium may be performed in a vacuum furnace maintained at 1~1.2 atm by continuously feeding argon gas, in which the inner temperature of the vacuum furnace may be increased at a heating rate of 5~10° C./min, and the lithium may undergo phase change for 30 min~2 hr under the condition that the inner temperature of the vacuum furnace is 400~600° C. so that the metal foam is impregnated therewith.

In yet another aspect of the present invention, the electrode cup may be provided with a lid, and the electrode cup may have a thickness of 50~100 μm and may be made of a metal having conductivity and being useful for a current collector, or an alloy including the metal. Furthermore, the conductive separation membrane may be provided in mesh form using a metal, a carbon material, or a combination of the metal and the carbon material, which are conductive, in which the conductive separation membrane may be formed to cover the metal foam and to be fixed by a lid provided to the electrode cup, and the mesh may have openings having a size 1~3 times the ion size.

In addition, the present invention provides an anode for a thermally activated reserve battery, manufactured by the method described above.

Advantageous Effects

According to the present invention, in a method of manufacturing an anode for a thermally activated reserve battery using a thin metal foam and a cup, a metal foam having superior electrical conductivity and porosity is impregnated with pure lithium to form an electrode for a thermally activated reserve battery, and thus the electrode can be prevented from leaking and thereby the battery does not short out. Furthermore, pure lithium having excellent capacity and output characteristics can be used under high-temperature operating conditions, thus remarkably improving energy density and output characteristics of the battery.

MODE FOR INVENTION

Figure 1:
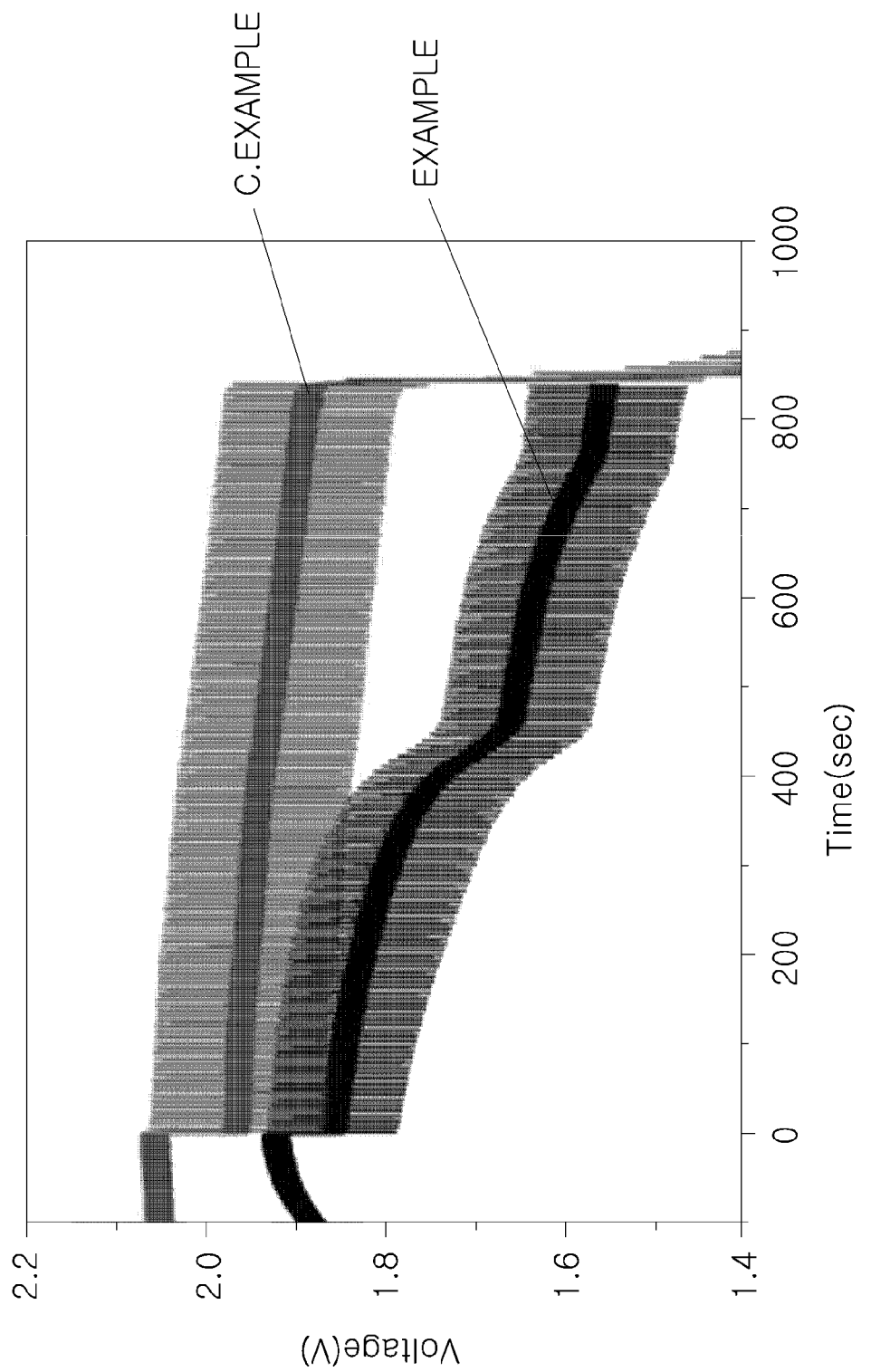
FIG. 1 is a graph illustrating the results of discharge characteristics of electrodes manufactured in Example and Comparative Example.

According to the present invention, a method of manufacturing an anode for a thermally activated reserve battery includes rolling a metal foam, coating the rolled metal foam with a molten eutectic salt, impregnating the metal foam with lithium, and providing the metal foam with an electrode cup and a conductive separation membrane.

More specifically, in the method of manufacturing an anode for a thermally activated reserve battery using a thin metal foam and a cup according to the present invention, a porous metal foam having excellent electrical conductivity is used as an anode support.

As for the metal foam, any material may be used without particular limitation so long as it has high conductivity and has a porosity of 60~98% of the total volume thereof. Particularly useful is a material that is relatively stable to lithium which is an example of an anode active material.

Specifically, the metal foam used herein preferably includes at least one selected from among nickel, iron, a carbon material, a nickel alloy, and an iron alloy.

The carbon material may include any one selected from among carbon black, carbon fiber, carbon nanofiber, carbon nanotubes, graphene, and graphite. Any pure carbon may be used so long as it receives lithium.

The metal foam preferably has a porosity of 60~98% of the total volume thereof.

If the porosity is less than 60% of the total volume, the amount of impregnated lithium may be decreased, undesirably deteriorating electrochemical properties. In contrast, if the porosity is greater than 98%, it is difficult to carry out impregnation with lithium upon rolling.

The metal foam has pores with an average diameter of 850 μm or less. If the average diameter thereof exceeds the above range, the impregnated lithium may easily escape from the pores and thus the battery may short out, undesirably making it impossible to perform the function of the metal foam as the support of lithium.

The rolling pressure of the metal foam is preferably set to about 5,000~20,000 kgf. If the rolling pressure is less than 5,000 kgf, rolling may not be efficiently implemented attributed to very weak rolling pressure. In contrast, if the rolling pressure exceeds 20,000 kgf, there is no difference in the rolling effect from when the rolling pressure is 20,000 kgf.

In the course of impregnating the metal foam with lithium at high temperature, a eutectic salt may be used as a wetting agent that facilitates the impregnation of the metal foam with lithium. In the course of initially coating the metal foam with the eutectic salt, a eutectic salt useful as an electrolyte for a thermal battery may be utilized. Preferably, a LiCl—KCl lithium eutectic salt or a LiCl—LiBr—LiF lithium eutectic salt is added so that the metal foam is coated therewith. More preferably useful is a LiCl—KCl lithium eutectic salt.

More specifically, the metal foam is immersed in the molten eutectic salt so that the surface of the metal foam is efficiently coated with the wetting agent.

The coating process with the eutectic salt is performed in such a manner that the rolled metal foam is immersed in the molten eutectic salt for about 1~5 sec, taken out thereof, and then rapidly cooled at room temperature.

If the immersion time of the metal foam in the eutectic salt is less than 1 sec corresponding to the lower limit, the metal foam may not be sufficiently coated with the eutectic salt. In contrast, if the immersion time exceeds 5 sec corresponding to the upper limit, the metal foam may be excessively coated and may be damaged by heat of the eutectic salt solution, which is undesirable.

In addition, a reserve battery resulting from the manufacturing method according to the present invention may include a cathode material and an anode material, which are typically useful without particular limitation. Preferred examples of the cathode active material include $FeS_2$, $CoS_2$, and mixtures and compounds thereof. The anode active material may include any one selected from among Li, LiSi, LiAl, and mixtures thereof, and preferably useful is Li.

Upon impregnating the metal foam with lithium, a spacer is placed on Grafoil, after which the metal foam coated with the eutectic salt is positioned on the spacer so as to receive lithium.

Lithium prepared to impregnate the metal foam therewith preferably has a volume 1~1.5 times the total volume of pores of the metal foam, taking into consideration porosity of the metal foam.

If the amount of lithium is less than 1 times the total volume of pores, lithium is not sufficiently loaded in the metal foam, and thus performance of the completed battery cannot be fully exhibited. In contrast, if the amount of lithium exceeds 1.5 times the total volume of pores, the electrode cannot be provided in desired form due to an excess of lithium that is left behind after the impregnation process.

As used herein, the term "impregnation" means that lithium infiltrates the pores of a metal foam via phase change.

Furthermore, the metal foam having lithium loaded therein is placed in a vacuum furnace, after which impregnation is carried out. As such, an inert gas is continuously fed into the vacuum furnace so that the pressure of the vacuum furnace is maintained at 1~1.2 atm.

The inner temperature of the vacuum furnace is increased at a heating rate of 5~10° C./min. The impregnation process is preferably carried out via reaction for 30 min~2 hr under the condition that the inner temperature of the vacuum furnace is 400~600° C.

Also, the inert gas is preferably argon gas. Other gases may react with lithium at high temperature and thus the metal foam may not be impregnated with lithium, which is undesirable.

If the inner pressure of the vacuum furnace is less than 1 atm corresponding to the lower limit, external air may be introduced into the vacuum furnace and thus undesirable side-reactions may occur easily. In contrast, if the inner pressure thereof exceeds 1.2 atm corresponding to the upper limit, there is no significant difference in the effect from when the inner pressure is 1.2 atm.

If the heating rate upon impregnation is less than 5° C./min corresponding to the lower limit, there is no significant difference in the effect from when the heating rate is 5° C./min. In contrast, if the heating rate exceeds 10° C./min corresponding to the upper limit, the melting time of lithium may become insufficient and thus the impregnation process cannot be performed as desired.

If the reaction temperature is less than 400° C. corresponding to the lower limit, melting of lithium does not occur, or the viscosity thereof is very high, and thus impregnation does not take place. In contrast, if the reaction temperature exceeds 600° C. corresponding to the upper limit, lithium may be decomposed or deformed due to high temperature.

If the lithium impregnation time is less than 30 min, impregnation may not occur sufficiently. In contrast, if the lithium impregnation time exceeds 2 hr, there is no difference in the effect from when the lithium impregnation time is 2 hr.

The temperature of the vacuum furnace is maintained at 400~600° C. for 30 min~2 hr, and is then lowered to room temperature via natural cooling.

As such, it is noted that the vacuum furnace not be opened before the temperature of the vacuum furnace is lowered to room temperature. During cooling, argon gas is preferably continuously fed into the vacuum furnace.

An electrode cup functions as a current collector, and is used to prevent leakage of lithium. The thickness of the electrode cup is preferably set to 50~100 μm. If the thickness of the electrode cup is less than 50 μm, the electrode cup is too thin, making it difficult to maintain the shape of the cup. In contrast, if the thickness of the electrode cup exceeds 100 μm, electron transfer may become difficult, and thus the electrode cup is difficult to function as a current collector.

Figure 2:
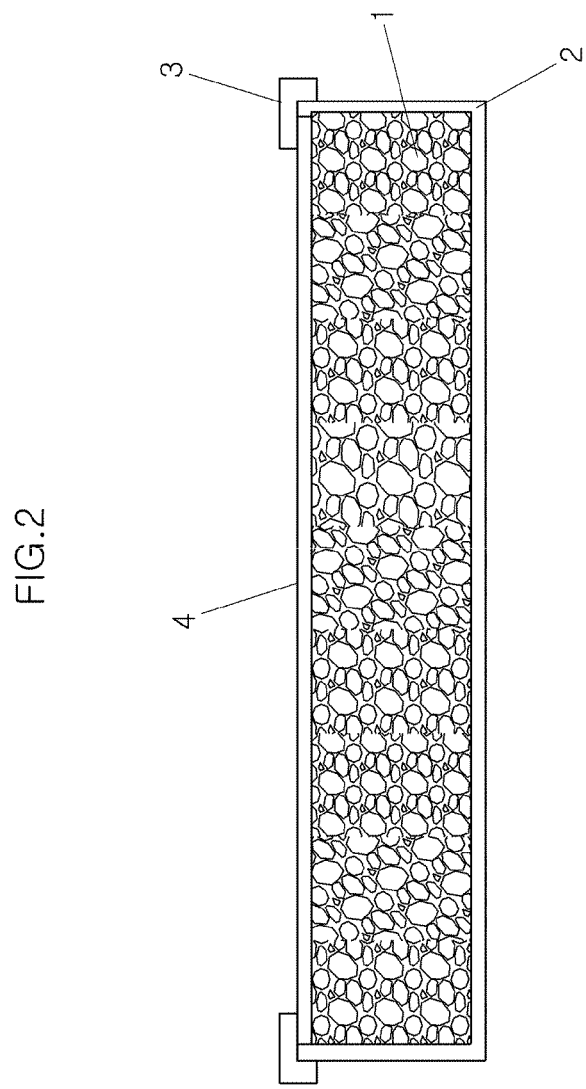
FIG. 2 is a cross-sectional view illustrating a lithium-impregnated anode using a rolled metal foam according to an embodiment of the present invention.

FIG. 2 illustrates the electrode cup, more specifically an electrode cup 2 including a metal foam 1 placed therein in which the metal foam 1 is covered with a conductive separation membrane 4 that is fixed by a lid 3 attached to the electrode cup 2.

The electrode cup may be made of a metal that is conductive and is useful for a current collector, or an alloy including such a metal.

Also, the conductive separation membrane is required to carry out a uniform electrochemical reaction for ionic movement between the anode and the electrolyte, and is positioned between the lid of the electrode cup and the electrode.

The conductive separation membrane is provided in mesh form that enables ionic conduction, in which the size of openings of the mesh is set to 1~3 times the ion size.

If the opening size of the mesh is less than 1 times the ion size, ionic conduction does not occur. In contrast, if the opening size thereof exceeds 3 times the ion size, ionic conduction excessively takes place, which is undesirable.

For the conductive separation membrane, any material, such as a metal, a carbon material, or mixtures thereof, may be used so long as it is conductive and is provided in mesh form.

Examples of the metal for the conductive separation membrane may include gold, silver, copper, iron, nickel, and alloys thereof, having high conductivity and thermal stability.

Examples of the carbon material for the conductive separation membrane may include conductive carbon materials, such as graphene, graphite, carbon nanotubes, carbon fiber, and mixtures thereof, which are in sheet form having openings.

In addition, the present invention addresses a thermally activated reserve battery using the anode comprising the metal foam impregnated with lithium.

A better understanding of the present invention may be obtained via the following examples, which are set forth to illustrate, but are not to be construed as limiting the scope of the present invention. The scope of the present invention is described in claims, and includes meanings equivalent to the claims and all modifications therein.

An anode of Example was manufactured through the following procedures. As such, a metal foam made of nickel with a pore size of 800 μm and a porosity of 90% was used.

The metal foam was rolled to 10,000 kgf and made into a diameter of 35 mm and a thickness of 0.5 mm.

The metal foam thus rolled was coated with a LiCl—KCl salt. Then, lithium, having the same volume as the total volume of pores of the metal foam corresponding to 1 times the pore volume, was positioned on the metal foam.

Thereafter, the prepared metal foam was placed in a vacuum furnace, and depressurized to −1 atm to be in a vacuum, after which argon gas was fed into the vacuum furnace. Such procedures were performed three times, thereby completely removing air from the vacuum furnace, resulting in an argon gas atmosphere.

While the flow rate of argon gas was uniformly maintained at 100 cc/min, the inner temperature of the vacuum furnace was increased at a heating rate of 10° C./min and maintained at 500° C. for 4 hr, so that the metal foam was impregnated with lithium, followed by natural cooling to room temperature.

Thereafter, the metal foam impregnated with lithium was taken out of the vacuum furnace, and placed in an electrode cup, after which a conductive separation membrane was placed thereon, and then covered with a lid of the electrode cup, thereby manufacturing an anode of Example.

In Comparative Example, a conventional LiSi anode was manufactured in pellet form. Unit cell batteries using the anodes of Example and Comparative Example were manufactured and subjected to discharge testing. The results are illustrated in FIG. 1.

Discharge was carried out at 500° C. with a pulse of average 2 A at 4 A for 1 sec, 2 A for 4 sec, and 0 A for 1 sec.

The initial OCV (Open Circuit Voltage) of Example was about 2.1 V, which was higher than 1.9 V as OCV of Comparative Example.

Upon discharge, the extent of reduction of voltage was quite low, compared to Comparative Example.

From such discharge results, the electrode capacity was calculated by Equation 1 below. The results are shown in Table 1 below.

$$\text{Electrode capacity} = \text{average current} * \text{discharge time} / \text{electrode weight} \quad \text{[Equation 1]}$$

TABLE 1

| Sample | Capacity (A · s/g) |
|---|---|
| Example | 1050 |
| C. Example | 2913 |

As is apparent from the results of Table 1 and FIG. 1, electrode performance at least about two times conventional anode performance was exhibited in the present invention.

DESCRIPTION OF THE REFERENCE NUMERALS IN THE DRAWINGS

1: metal foam
2: electrode cup
3: lid
4: conductive separation membrane

The invention claimed is:

1. A method of manufacturing an anode for a thermally activated reserve battery using a thin metal foam and a cup, comprising:
   1) rolling a metal foam;
   2) coating the metal foam with a molten eutectic salt;
   3) impregnating the coated metal foam with lithium; and
   4) providing the impregnated metal foam with an electrode cup and a conductive separation membrane,
   wherein the metal foam comprises a porous material having electrical conductivity,
   wherein the metal foam has a porosity of 90% of a total volume thereof, for the metal foam being impregnated with lithium, and
   wherein pores of the metal foam are formed into an average diameter of 800 μm, for preventing the impregnated lithium escaping from the pores.

2. The method of claim 1, wherein the metal foam is made of a nickel alloy or an iron alloy comprising nickel, iron, and a carbon material.

3. The method of claim 2, wherein the carbon material comprises any one selected from the group consisting of carbon black, carbon fiber, carbon nanofiber, carbon nanotubes, graphene, and graphite.

4. The method of claim 1, wherein rolling the metal foam is performed at a pressure of 5,000~20,000 kgf.

5. The method of claim 1, wherein the eutectic salt comprises a LiCl—KCl lithium eutectic salt or a LiCl—LiBr—LiF lithium eutectic salt.

6. The method of claim 1, wherein coating the metal foam with the eutectic salt comprises: immersing the metal foam in the eutectic salt for 1~5 sec, removing the metal foam from the eutectic salt, and rapidly cooling the metal foam removed from eutectic salt at room temperature.

7. The method of claim 1, wherein impregnating the coated metal foam with lithium is performed using lithium having a volume which is 1~1.5 times of a total volume of pores of the metal foam.

8. The method of claim 1, wherein impregnating the coated metal foam with lithium is performed in a vacuum furnace maintained at 1~1.2 atm by continuously feeding an inert gas, in which an inner temperature of the vacuum furnace is increased at a heating rate of 5~10° C./min, and the lithium undergoes phase change for 30 min~2 hr under a condition that the inner temperature of the vacuum furnace is 400~600° C. so that the coated metal foam is impregnated therewith.

9. The method of claim 1, wherein the electrode cup is provided with a lid, the electrode cup has a thickness of 50~100 μm, and the electrode cup is made of a metal having conductivity and capable of being a current collector, or an alloy including the metal.

10. The method of claim 1, wherein the conductive separation membrane is provided in mesh form using a metal, a carbon material, or a combination of the metal and the carbon material, in which the conductive separation membrane is formed to cover the metal foam and to be fixed by a lid provided to the electrode cup.

* * * * *